(12) United States Patent
Krausz et al.

(10) Patent No.: US 7,748,753 B2
(45) Date of Patent: Jul. 6, 2010

(54) PIPES COUPLING WITH INTEGRATED GRIP

(75) Inventors: Eliezer Krausz, Tel-Aviv (IL); Avi Chiproot, Kfar-Saba (IL)

(73) Assignee: Krausz Industries Development Ltd., Tel Aviv (IL)

( * ) Notice: Subject to any disclaimer, the term of this patent is extended or adjusted under 35 U.S.C. 154(b) by 587 days.

(21) Appl. No.: 11/713,654

(22) Filed: Mar. 5, 2007

(65) Prior Publication Data

US 2008/0012339 A1    Jan. 17, 2008

(30) Foreign Application Priority Data

Mar. 5, 2006    (IL)    ....................... 174110

(51) Int. Cl.
   *F16L 21/02*    (2006.01)
(52) U.S. Cl. ...................... 285/373; 285/104
(58) Field of Classification Search ................. 285/420, 285/373, 104
   See application file for complete search history.

(56) References Cited

U.S. PATENT DOCUMENTS

| | | | | | |
|---|---|---|---|---|---|
| 3,610,654 | A | * | 10/1971 | Torres | 285/106 |
| 3,877,733 | A | * | 4/1975 | Straub | 285/105 |
| 4,108,479 | A | * | 8/1978 | Straub | 285/112 |
| 4,119,333 | A | * | 10/1978 | Straub | 285/112 |
| 4,629,217 | A | * | 12/1986 | Straub | 285/112 |
| 4,664,422 | A | * | 5/1987 | Straub | 285/112 |
| 4,726,611 | A | * | 2/1988 | Sauer | 285/110 |
| 5,273,322 | A | * | 12/1993 | Straub | 285/112 |
| 5,280,970 | A | * | 1/1994 | Straub | 285/112 |
| 5,310,223 | A | * | 5/1994 | Straub | 285/112 |
| 5,351,997 | A | * | 10/1994 | Webb et al. | 285/105 |
| 5,772,257 | A | * | 6/1998 | Webb et al. | 285/112 |
| 6,070,914 | A | * | 6/2000 | Schmidt | 285/112 |
| 6,328,352 | B1 | * | 12/2001 | Geppert et al. | 285/373 |
| 6,502,865 | B1 | | 1/2003 | Steele | |
| 6,581,982 | B1 | | 6/2003 | Nghiem | |
| 6,595,559 | B1 | | 7/2003 | Readman | |
| 6,672,631 | B1 | | 1/2004 | Weinhold | |
| 6,676,166 | B1 | | 1/2004 | Wraith et al. | |
| 6,739,630 | B2 | | 5/2004 | Riedy | |

(Continued)

OTHER PUBLICATIONS

Office Action of Israel Application No. 174110 mailed on Oct. 23, 2008.

*Primary Examiner*—David E Bochna
(74) *Attorney, Agent, or Firm*—Pearl Cohen Zedek Latzer LLP

(57) ABSTRACT

A band coupling for straight line interconnection of flangeless pipes and a built in pipe grip mechanism to resist axial separation forces is provided. The band-clamp coupling comprises an outer housing of cross-section resembling a wide, low-wall channel, the walls thereof facing the center of the pipes, and a low-wall inner channel fitting into the outer channel. The inner channel being provided with spaced-apart inwardly-facing projection adjacent to each of the inner channel walls, each projection having a first sloping side axially facing the line of pipe abutment and a second sloping side axially facing away from the line of pipe abutment. A sloped internally-toothed grip washer is disposed along each of the projection second sides; and a seal member is disposed inside the inner channel and extending along the major portion of the width thereof to abut both the first sides axially facing the line of pipe abutment.

4 Claims, 5 Drawing Sheets

U.S. PATENT DOCUMENTS

| | | |
|---|---|---|
| 6,749,232 B2 * | 6/2004 | Wachter et al. ............. 285/104 |
| 6,824,172 B1 | 11/2004 | Komolrochanaporn |
| 6,843,514 B2 | 1/2005 | Rex et al. |
| 6,851,728 B2 | 2/2005 | Minami |
| 6,877,777 B1 | 4/2005 | Wartluft |
| 7,396,053 B2 * | 7/2008 | Webb et al. ................. 285/373 |

* cited by examiner

PIPES COUPLING WITH INTEGRATED GRIP

CROSS-REFERENCE TO RELATED APPLICATION

This application is a Convention Filing of Israel Patent Application No. 174110, filed Mar. 5, 2006, which is hereby incorporated by reference in its entirety.

FIELD OF THE INVENTION

The present invention relates to the interconnection of co-axial pipes.

More particularly, the invention provides a band coupling for straight line interconnection of flangeless pipes and provides a built in pipe grip mechanism to resist axial separation forces.

BACKGROUND OF THE INVENTION

As the requirement for straight-line interconnection of pipes is widespread, a large market exists for pipe couplings for this purpose, and thousands of different designs have been disclosed. Some have been commercially developed as a solution for closely-defined requirements. In choosing a coupling much depends on factors such as the material of the pipe, whether an external anchor (such as a flange) is available, pipe diameter and variation of said diameter expected, the fluid being transported, stresses expected, environmental conditions, whether the joint is to be permanent or openable, whether welding is allowed or not, the allowed hydraulic resistance and further factors. Thus, there is no best valve for all applications. All that can be said is that the best valve is the lowest cost valve that meets all the requirements of a specified application.

Many satisfactory solutions exist and are in use for the joining of small diameter pipes made of copper, steel, plastics, aluminium and other materials. While band clamp couplings can be used for diameters as small as 25 mm, usually other well-established methods are more appropriate and economical. The present invention is thus concerned primarily with pipe diameters over 75 mm (about 3").

The following U.S. patents provide an indication of the state of the art in this field.

In U.S. Pat. No. 3,877,733 the present inventor disclosed a pipe coupling with a sealing gasket. The coupling was satisfactory for applications where no substantial axial forces need to be resisted. The present inventor disclosed similar though more complex couplings including a spring element in U.S. Pat. Nos. 4,119,333 and 4,629,217.

In U.S. Pat. No. 6,502,865 Steele discloses a peripherally-clamped coupling which does not intrude on the pipe inner diameter. The first embodiment of the coupler does however require the welding on of a square-section ring on the outside of both pipes. In many applications welding is time-consuming, prohibited or impossible, which limits the applications of this type of coupling.

A deformable metal sleeve is used as a pipe connector in the proposed coupling disclosed by Nghiem in U.S. Pat. No. 6,581,982. Axial force is applied to the sleeve which then distorts and compression-enters soft material in the coupling flange. This needs to be repeated for the second pipe and for the second coupling flange. Application of a high axial force in the field is difficult, and there is no way either to further tighten or to open the coupling. The same remarks apply to the coupling disclosed by Readman in U.S. Pat. No. 6,595,559, which has an additional disadvantage in that the flow of fluid in the pipe is somewhat restricted.

A pipe clamp composed of two clamp halves, each provided with its own tension band is disclosed by Weinhold in U.S. Pat. No. 6,672,631. The device has a quick-acting closure, but no protection against axial separating forces, and in use it is difficult to prevent fluid leakage due to gaps between the two bands.

Wraith et al disclose a plastic pipe coupling in U.S. Pat. No. 6,676,166. The device would not be usable for large diameter steel pipes as the assembly forces required would be very large and also the coupling can not be tightened to prevent leakage.

The design seen in U.S. Pat. No. 6,739,630 to Riedy is unsuitable for large diameter pipes as it requires one end of one of the pipes to carry an external threw thread. Furthermore there remains the difficult task of revolving the large diameter nut sleeve while preventing revolution of the pipe carrying the male thread in order to apply the coupling.

A further band clamp coupling is seen in U.S. Pat. No. 6,749,232 to Wachter et al. Provision is made for deterring axial separation, but sealing this type of clamp against leakage is problematic due to the gap between the ends of the band.

Komolrochanaporn discloses a push-pull pipe coupling in U.S. Pat. No. 6,824,172. Both fluid sealing and mechanical retention are provided. There is however no way of tightening the seal and this type of coupler is unsuited for large diameter pipes and cannot handle pipe diameter variations.

Rex et al. disclose a pipe coupling in U.S. Pat. No. 6,843,514 which could be suitable for large diameter pipes. It is however not clear how the gripping device is to handle pipe diameter variations. The thin seal used and its indirect manner of applying pressure to the outer surface of the pipes appear to be the weak points of this design.

In U.S. Pat. No. 6,851,728 Minami also discloses a pipe coupling provided with both sealing and gripping members. However the design does not make provision for substantial outer diameter variations and the locking mechanism would be difficult to operate if applied to large diameter pipes.

Wartluft in U.S. Pat. No. 6,877,777 discloses a complex coupling which requires the insertion of a sleeve into the bore of the pipes to be interconnected. Any intrusion into the inner space of a pipe is of course detrimental in increasing the hydraulic resistance of the pipeline.

One of the shortcomings of prior-art pipe couplings is an inability to interconnect pipes varying more than about 3 mm from the nominal outside diameter. Variations larger than this can occur, either through manufacturing variations or because the pipe has been coated with some corrosion-protection material.

OBJECTS OF THE PRESENT INVENTION

It is therefore one of the objects of the present invention to obviate the disadvantages of prior art pipe couplings and to provide a coupling which is suitable for large diameter pipes and has adequate arrangements for both mechanical and fluid retention.

It is a further object of the present invention to provide such a coupling able to join pipes of diameters varying within a larger range, in large diameter piping allowing diameter variations up to about 10 mm.

Yet a further object of the invention is to join the pipe ends without intruding on the pipe inner diameter.

SUMMARY OF THE PRESENT INVENTION

The present invention achieves the above objects by providing an improved releasable band-clamp coupling for mechanical and hydraulic linear interconnection of the ends of two pipes; comprising:

a) an outer housing of cross-section resembling a wide, low-wall channel, the walls thereof facing the center of said pipes and the housing being curved to be slightly larger than the pipe diameter;

b) a low-wall inner channel fitting into said outer channel, said inner channel being provided with spaced-apart inwardly-facing projection adjacent to each of said inner channel walls, each projection having a first sloping side axially facing the line of pipe abutment and having a second sloping side axially facing away from said line of pipe abutment;

c) a sloped internally-toothed grip washer disposed proximate to each of said projection second sides;

d) a circumferential elastomeric seal member disposed inside said inner channel and extending along the major portion of the width thereof to abut both said first sides axially facing the line of pipe abutment; and e) clamping elements to allow clamping of said housing around said pipes, preventing leakage of fluid carried by said pipes and preventing axial separation therebetween.

In a preferred embodiment of the present invention there is provided a releasable coupling wherein the internal diameter of said sloped internally-toothed grip washer is smaller than the internal diameter of said outer housing and larger than the internal diameter of said seal member when assembled over a pipe.

In a further preferred embodiment said housing is provided with a pair of end extensions to allow clamping by reducing the distance between said extensions.

In a further preferred embodiment of the present invention there is provided a releasable coupling wherein said sloped internally-toothed grip washer is split by a radial gap.

In yet a further preferred embodiment of the present invention there is provided a releasable coupling wherein said sloped internally-toothed grip washer is made of hardened steel.

In a most preferred embodiment of the present invention there is provided a releasable coupling wherein said seal member is shaped similar to a pair of "d"s, the upper part of the letters being joined and the long face thus provided is being in contact with the inner portion of said low-wall inner channel.

It will thus be realized that the novel device of the present invention serves to overcome the limitations of prior-art pipe couplings and to provide a coupling which makes allowance for variations in the pipes to be connected.

In comparison with prior-art designs the coupling of the present invention has very few parts, due to the inner channel being formed to support both the seal member and the two grip washers.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

FULL DESCRIPTION OF THE INVENTION

Figure 1:
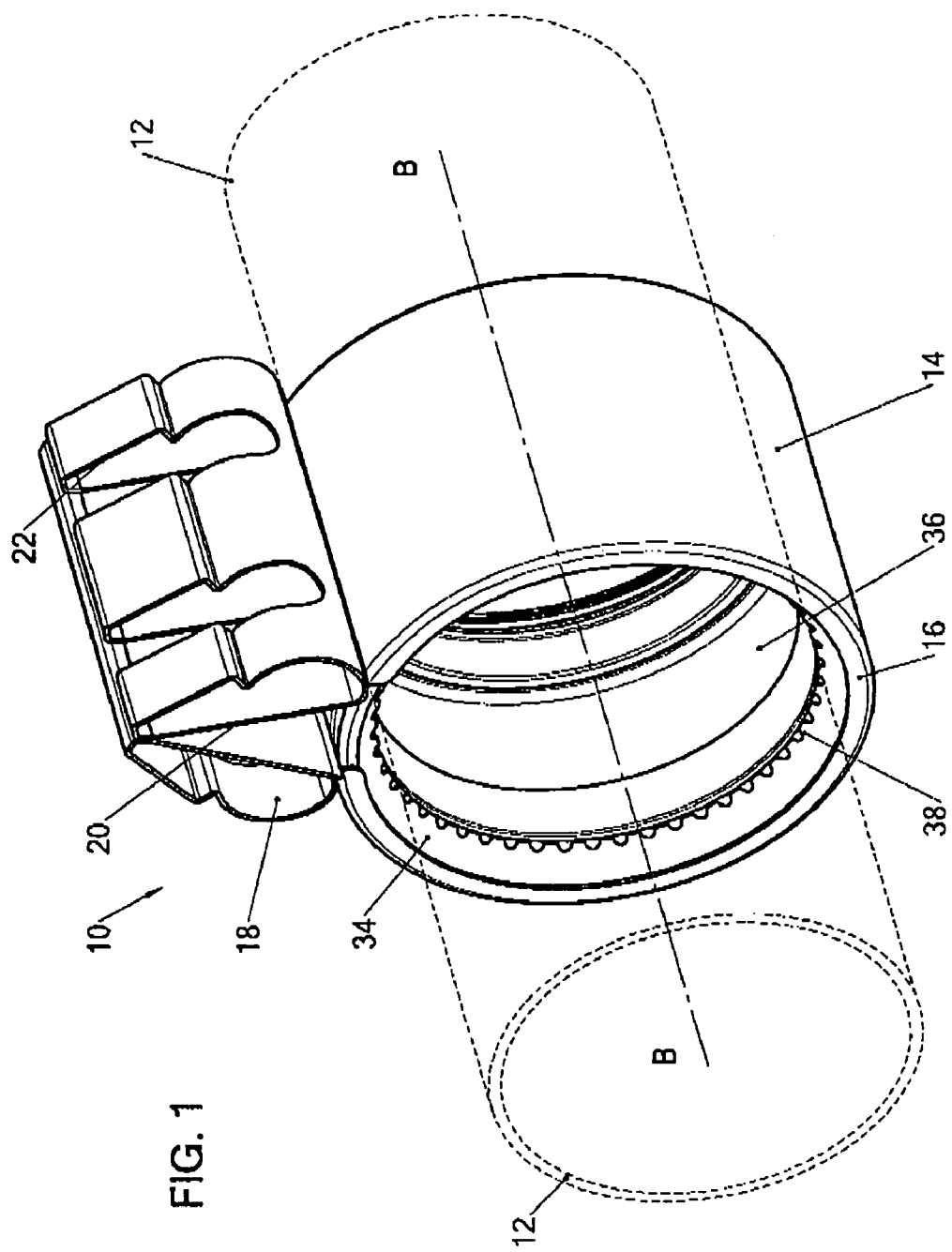
FIG. 1 is a perspective view of a preferred embodiment of the coupling according to the invention.
Figure 2:
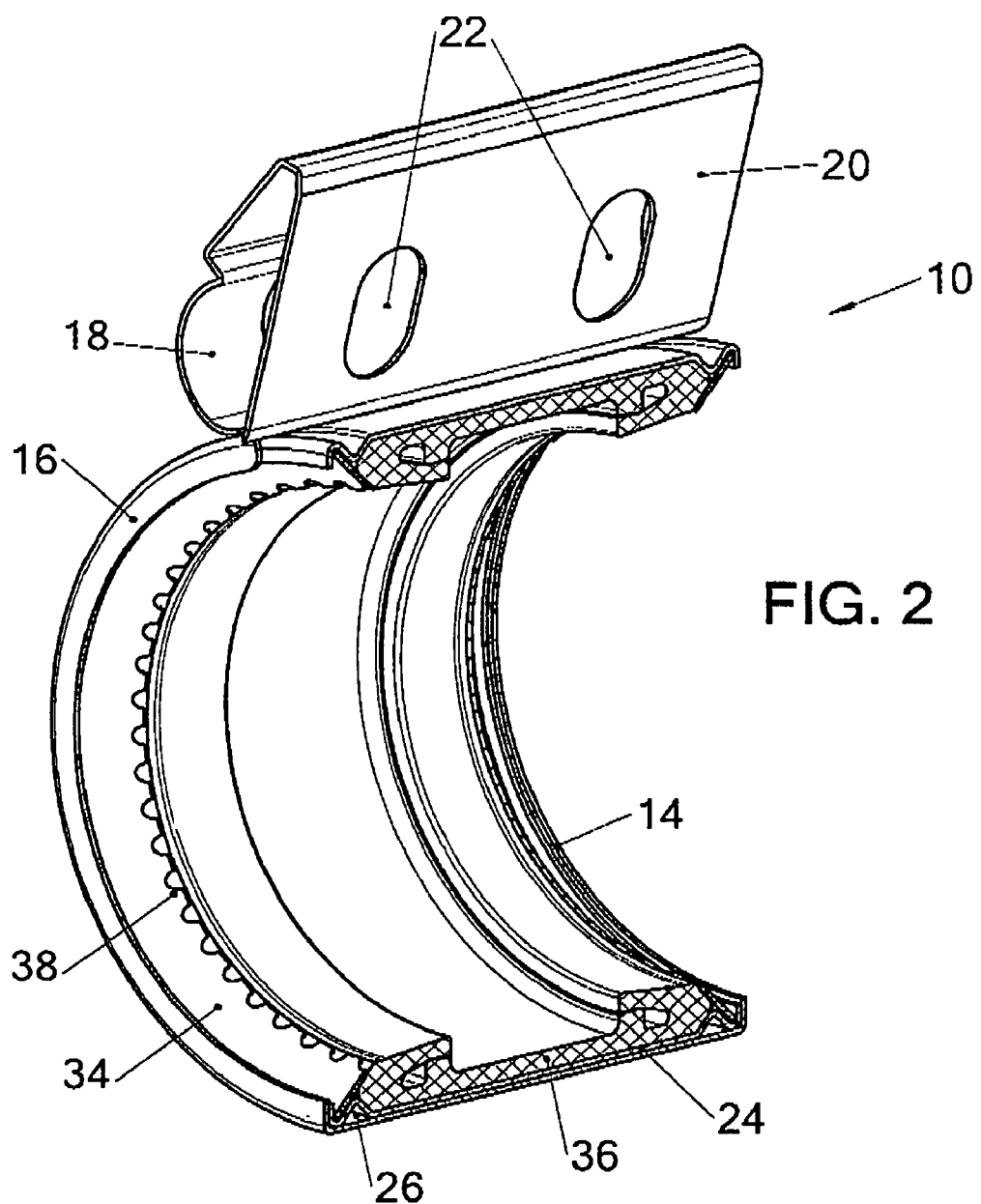
FIG. 2 is a perspective sectional view of the same embodiment.

There is seen in FIGS. 1 and 2 an improved band-clamp releasable coupling 10 for mechanical and hydraulic linear interconnection of the ends of two pipes 12.

Figure 3:
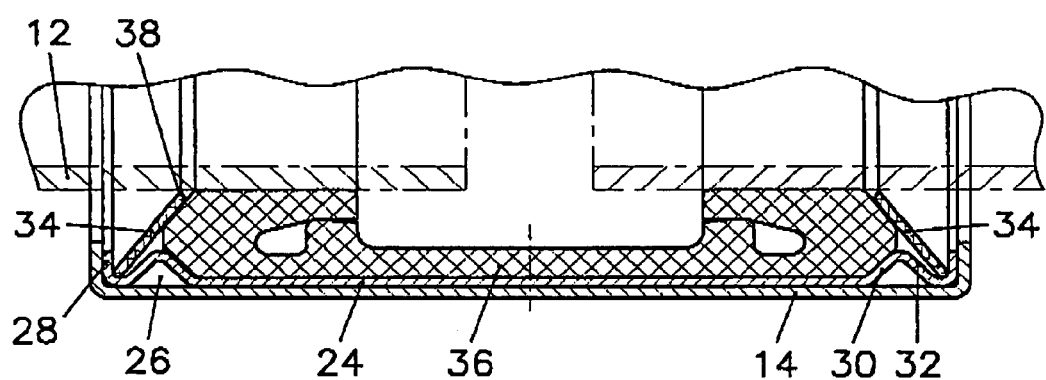
FIG. 3 is a sectional view of the coupling before tightening thereof.

An outer housing 14 of cross-section resembling a wide, low-wall channel can suitably be made of stainless steel. The low walls 16 of the channel face the center BB of the coupling. The housing 14 is curved to be slightly larger than the pipe diameter. The extremities 18 of the housing channel 14 are bent and formed so that a pair of end extensions 20 is obtained which allow clamping. Apertures 22 for screw clamping are seen in the end extensions 20. Referring now also to FIG. 3 where details are seen to better effect, a low-wall inner channel 24 is curved to fit snugly into the outer housing 14. The inner channel 24 is provided with two spaced-apart inwardly-facing projections 26 adjacent to each of the inner channel walls 28. Each projection 26 has a first sloping side 30 axially facing the line of pipe abutment. A second sloping side 32 axially faces away from the line of pipe abutment.

A sloped internally-toothed grip washer 34 is disposed proximate to each of the projection second sides 32. The inner diameter of the grip washer 34 is about a mm larger than the largest pipes 12 to be coupled. The teeth 38 of the grip washer 34 always face the pipe abutment area.

A circumferential elastomeric seal member 36 is disposed inside the inner channel 24 and extends along the major portion of the width thereof. The seal member 36 abuts the first sloping sides 30 of the projections 26 at each side.

Screw clamping elements (not shown) are arranged to reduce the distance between the end extensions 20, thus causing clamping of the outer housing 14 around the pipes 12. Tightening the screw clamping elements presses the seal member 36 onto the outer diameter of the pipes 12 thus preventing leakage of fluid carried by said pipes. Further tightening increases seal contact pressure and forces the internally toothed grip washer 34 into engagement with the pipes 12 and thereby prevents axial separation therebetween.

It is within the scope of the invention to use other or different clamping means.

With reference to the rest of the figures, similar reference numerals have been used to identify similar parts.

Continuing to refer to FIG. 3, there is seen a releasable coupling wherein the internal diameter of the sloped internally-toothed grip washer 34 is smaller than the internal diameter of the outer housing 14 and larger than the internal diameter of the seal member 36 when assembled over a pipe end.

Figure 4:
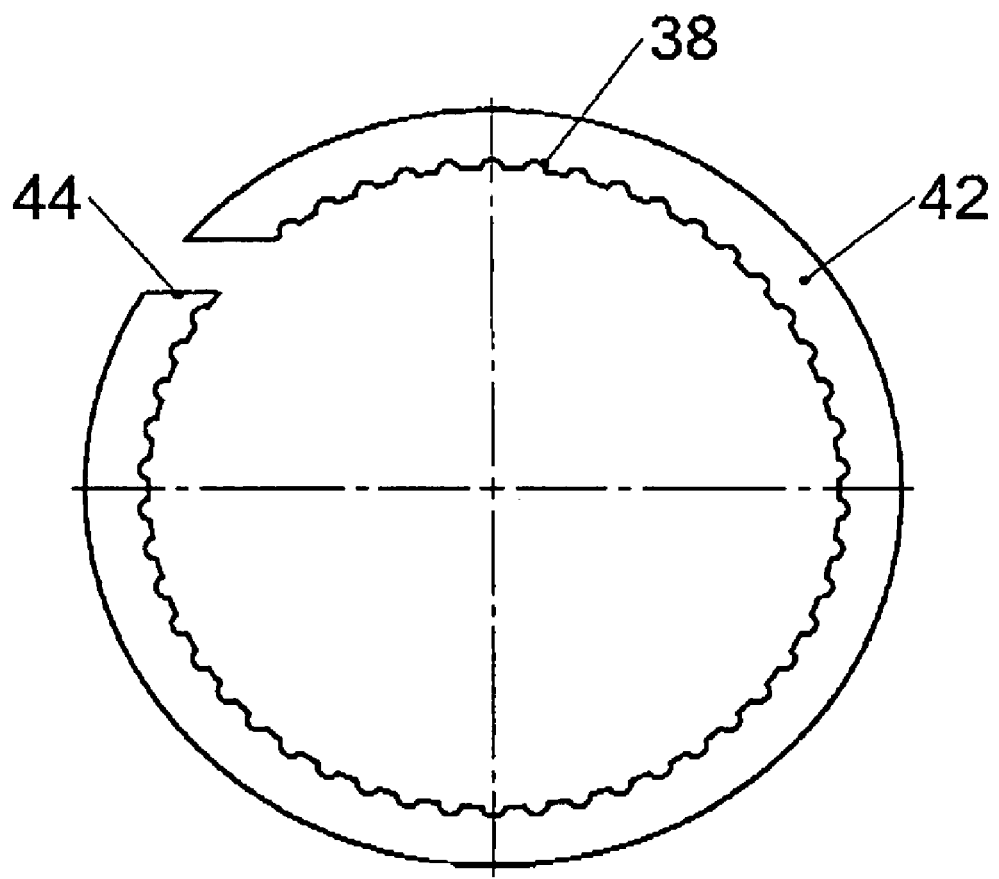
FIG. 4 is a view of a second embodiment of the grip washer seen in FIGS. 1 and 2.

Seen in FIG. 4 is detail of a releasable coupling, wherein the sloped internally-toothed grip washer 42 is split by a radial gap 44. The gap 44 is closed when the coupling is fully tightened around a pipe of the minimum diameter in its range. The toothed split grip washer 42 is dimensioned so that the material stresses caused by forcible closing of the gap 44 remain in the elastic range of the material. It should be understood that both ends of gap 44 of washer 42 may overlap each other.

Figure 5:
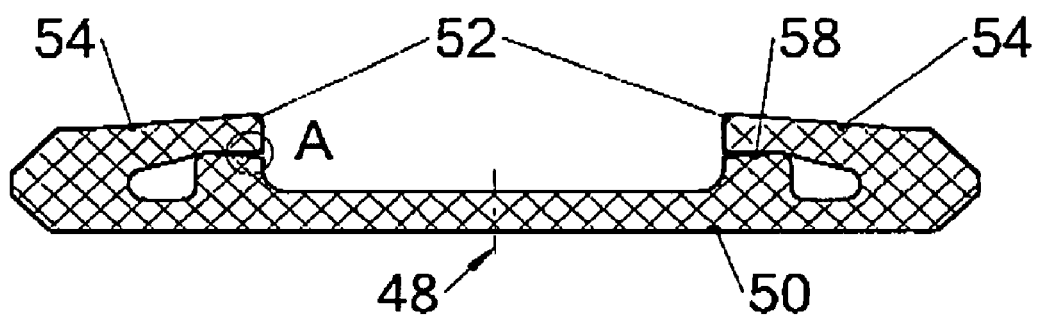
FIG. 5 is a sectional elevational view of a seal member suitable for use in the coupling.

Referring now to FIG. 5, there is depicted a detail of a releasable coupling, wherein the seal member 46 is shaped similar to a pair of "d"s. Both "d"s are laid adjacently on a horizontal surface. The extending portion 48 of the letters are interconnected at their extremities to form the long lower face 50 seen in the figure. When the coupling is in use, a pair of outer projecting corners 52 make first contact with the pipes 12 seen in FIG. 1. The seal member 46 is supported by the inner portion of the low-wall inner channel 24. As the coupling is further tightened the surfaces 54 come into contact with the pipe to form an extended width sealing area.

Figure 6:
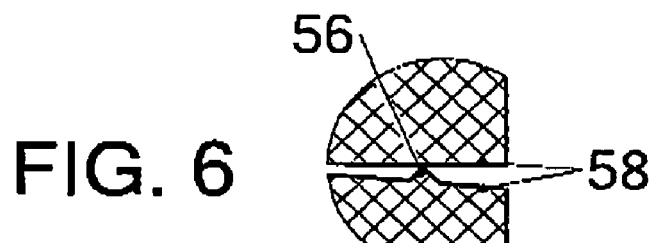
FIG. 6 is a sectional view of a detail A seen in FIG. 5.

FIG. 6 shows a detail "A" of the seal member 46. A small projection 56 on one of the inner faces 58 of the seal member 46 ensures that there is seal contact with the pipe even when sealing pressure is only moderate. When seal pressure is high the projection is elastically crushed and plays no role until seal pressure is reduced.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

We claim:

1. An improved band-clamp releasable coupling for mechanical and hydraulic linear interconnection of the ends of two pipes; comprising:
    a) an outer housing of cross-section resembling a wide, low-wall channel, the walls thereof facing the center of said pipes and the housing being curved to be slightly larger than the pipe diameter;
    b) a low-wall inner channel fitting into said outer channel, said inner channel being provided with spaced-apart inwardly-facing projections adjacent to each of said inner channel walls, each projection having a first sloping side axially facing a line of pipe abutment and having a second sloping side axially facing away from said line of pipe abutment;
    c) a sloped internally-toothed grip washer disposed proximate to each of said projection second sides;
    d) a circumferential elastomeric seal member disposed inside said inner channel and extending along the major portion of the width thereof to abut both said first sides axially facing the line of pipe abutment; and
    e) clamping elements to allow clamping of said housing around said pipes, preventing leakage of fluid carried by said pipes and preventing axial separation therebetween.

2. The releasable coupling as claimed in claim 1, wherein the internal diameter of said sloped internally-toothed grip washer is smaller than the internal diameter of said outer housing and larger than the internal diameter of said seal member when assembled over a pipe end.

3. The releasable coupling as claimed in claim 1, wherein said sloped internally-toothed grip washer is split by a radial gap.

4. The releasable coupling as claimed in claim 1, wherein said sloped internally-toothed grip washer is made of hardened steel.

\* \* \* \* \*